(12) United States Patent
Klenk et al.

(10) Patent No.: US 11,774,257 B2
(45) Date of Patent: *Oct. 3, 2023

(54) USER BEHAVIOR INFLUENCE IN TRANSPORTATION SYSTEMS

(71) Applicant: Xerox Corporation, Norwalk, CT (US)

(72) Inventors: Matthew Klenk, San Francisco, CA (US); Victoria M. Bellotti, Oakland, CA (US); Shiwali Mohan, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 114 days.

This patent is subject to a terminal disclaimer.

(21) Appl. No.: 17/354,820

(22) Filed: Jun. 22, 2021

(65) Prior Publication Data

US 2021/0318130 A1 Oct. 14, 2021

Related U.S. Application Data

(63) Continuation of application No. 16/181,152, filed on Nov. 5, 2018, now Pat. No. 11,054,268.

(51) Int. Cl.
*G01C 21/34* (2006.01)
*G01C 21/36* (2006.01)
(Continued)

(52) U.S. Cl.
CPC ..... *G01C 21/3484* (2013.01); *G01C 21/3461* (2013.01); *G01C 21/3605* (2013.01);
(Continued)

(58) Field of Classification Search
CPC ............ G01C 21/3484; G01C 21/3461; G01C 21/3605; G01C 21/3676; G01C 21/3697;
(Continued)

(56) References Cited

U.S. PATENT DOCUMENTS

2010/0228574 A1\* 9/2010 Mundinger .......... G06Q 10/047
701/532
2011/0082752 A1 4/2011 Dube et al.
(Continued)

OTHER PUBLICATIONS

Anagnostopoulou et al., "Exploring the Links Between Persuasion, Personality and Mobility Types in Personalized Mobility Applications", Persuasive 2017, LNCS 10171, pp. 107-118.
(Continued)

*Primary Examiner* — Joshua E Rodden
(74) *Attorney, Agent, or Firm* — Womble Bond Dickinson (US) LLP

(57) ABSTRACT

Systems and methods described receive a request for a transportation plan for a user, wherein the request comprises a starting point and an ending point for a route. Systems and methods then generate a set of potential transportation plans for the route, determine an impact of a subset of plans in the set of potential transportation plans and estimate a likelihood of acceptance of the subset of plans in the set of potential transportation plans based on a personal preference model for the user. Systems and methods also select an influence strategy of the user based on a user model and generate a message recommending a selected plan from the subset of plans for the user, wherein the message is generated based on the selected influence strategy.

20 Claims, 6 Drawing Sheets

(51) Int. Cl.
*G06F 16/23* (2019.01)
*G06F 16/29* (2019.01)
*G06F 16/2457* (2019.01)

(52) U.S. Cl.
CPC ..... *G01C 21/3697* (2013.01); *G06F 16/2379* (2019.01); *G06F 16/24575* (2019.01); *G01C 21/3676* (2013.01); *G06F 16/29* (2019.01)

(58) Field of Classification Search
CPC . G06F 16/2379; G06F 16/24575; G06F 16/29
USPC ........................................................ 701/533
See application file for complete search history.

(56) References Cited

U.S. PATENT DOCUMENTS

| | | | |
|---|---|---|---|
| 2011/0145290 A1 | 6/2011 | Fujii et al. | |
| 2014/0358435 A1* | 12/2014 | Bell .................. | G01C 21/3492 701/527 |
| 2015/0230061 A1* | 8/2015 | Srivastava ............ | H04W 4/029 705/324 |
| 2016/0131493 A1 | 5/2016 | Bostick et al. | |
| 2017/0023370 A1* | 1/2017 | Delaney ............. | G01C 21/3484 |
| 2017/0138752 A1 | 5/2017 | Mermelstein | |
| 2017/0213273 A1 | 7/2017 | Dietrich et al. | |
| 2019/0383621 A1 | 12/2019 | Isaacs et al. | |
| 2020/0249047 A1* | 8/2020 | Balva ................. | G06Q 10/0631 |
| 2021/0341300 A1* | 11/2021 | Beaurepaire ....... | G01C 21/3492 |
| 2022/0230213 A1* | 7/2022 | Ross .................. | G01C 21/3492 |
| 2022/0276066 A1* | 9/2022 | Beaurepaire .......... | G06Q 10/02 |
| 2022/0341746 A1* | 10/2022 | Simoudis ........... | G01C 21/3697 |

OTHER PUBLICATIONS

Uylhä et al., "MatkaHupi: a Persuasive Mobile Application for Sustainable Mobility", Session: Poster, Demo, & Video, Presentations, UbiComp'13, Sep. 8-12, 2013, Zurich, Switzerland, pp. 227-230.

Thivaios et al., Optimum, "Multi-source Big Data Fusion Driven Proactivity for Intelligent Mobility", State-of-the-Art Report, Version 2.0, Mar. 31, 2017, 156 pages.

SuberHub—Tailor made mobility, Digital Single Market, Projects and Initiatives—https://ec.europa.eu/digital-single-market/en/content/superhub-tailor-made-mobility, 4 pages.

* cited by examiner

USER BEHAVIOR INFLUENCE IN TRANSPORTATION SYSTEMS

CROSS-REFERENCE TO RELATED APPLICATION

This application is a continuation of U.S. patent application Ser. No. 16/181,152, filed Nov. 5, 2018, the entire contents of which are hereby incorporated by reference.

STATEMENT OF GOVERNMENT SUPPORT

This invention was made with Government support under Contract No. DE-AR0000612 Multi-Agent Trip Planning And Personality Based Influencing To Reduce Energy awarded by the Advanced Research Projects Agency-Energy (ARPA-E). The Government has certain rights in this invention.

TECHNICAL FIELD

Implementations of the present disclosure relate to planning and implementation of transportation routes.

BACKGROUND

The use of systems to generate transportation plans from one location to another can enable users to navigate in unknown areas without the need for a map, asking for directions, knowledge of local transportation options, or planning ahead. However, such transportation plans may not be optimal for user preferences or the transportation system and users may not adopt more beneficial transportation plans.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Figure 1:
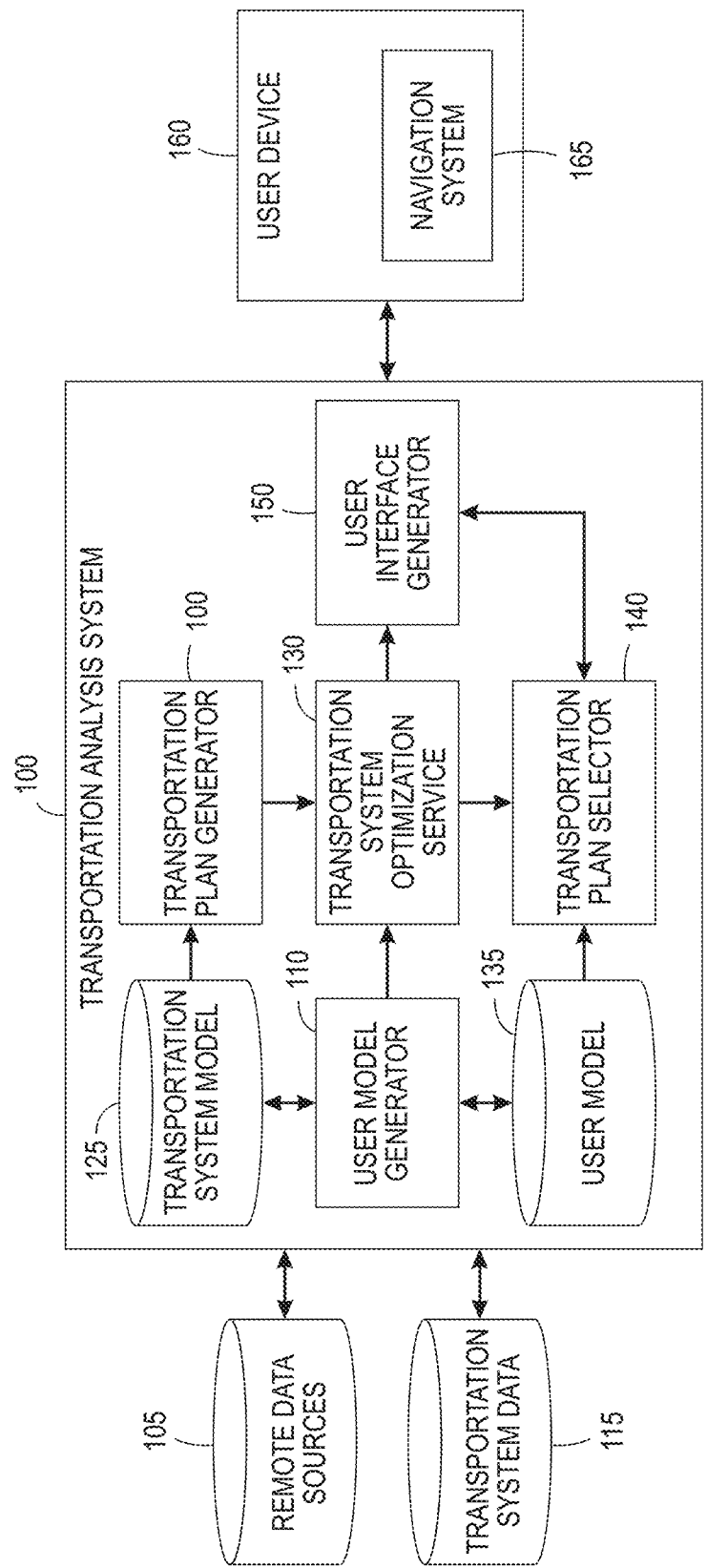
FIG. 1 is a schematic diagram of an embodiment of systems to generate a transportations plan, which can be used in accordance with some embodiments.

Described herein are navigation systems providing recommended routes that accomplish a goal of a transportation system and are provided to commuters and travelers based on user preferences. While systems can provide optimized routes for individuals, those recommendations may impact a transportation system or goal of a stakeholder of that transportation system. Accordingly, other transportation plans may have benefits for the transportation system or a particular user. However, providing transportation plans that may improve a goal of a transportation system may result in recommending plans to a user that the user is unlikely to accept. Systems and method described herein select plans that improve an application goal, but also generate messages to persuade a user to accept the provided recommendation. Thus, systems and methods determine a likelihood of acceptance of various transportation plans for a user based on a user model of that user. The system then selects a transportation plan to provide to the user based on the likelihood of acceptance of the plan and generates a message to influence acceptance by the user.

In some embodiments, a selected plan may be provided to a user with a message selected to improve the potential acceptance by the user. For example, certain plans may contribute to one or more goals that may influence particular users. The system may determine, based on a user model, a plan most likely to be accepted as well as messaging directed to that user. For example, certain users may respond better or worse to messaging involving reciprocity, social proof (conformity), commitment, liking, authority, scarcity, or unity messaging. Messages may then be designed for a particular user based on available transportation plans and personal preferences of the user.

In some embodiments, a transportation analysis system may determine potential transportation plans and influence a user to accept one such plan using a variety of factors. The transportation analysis system may use static context, dynamic contexts, personal preference, influenceability, application goals, or a combination thereof to influence a user. Static context factors include factors that don't change such as available options and the convenience and desirability of those options. For example, a multi-modal transportation system may include a number of public transportations options as well as one or more transportations options that are available to individuals. Dynamic context factors include factors that change or influence the convenience or desirability of travel options. For example, changing weather conditions may affect whether or not walking or biking transportation modes are readily available to a user at a specific time. Personal preferences include those preferences about an individual. These can include preferences for particular modes of travel compared to others, as well as the importance of arriving at a particular time, leaving at a particular time, making stops along the way, or other personal preferences of a user. The personal preferences may be generated through survey data or observations of a user's response to suggested routes. Influenceability factors include identification of strategies that a person is susceptible to and what degree. Although other models can be used to determine a user's infuenceability, in some embodiments, the personal preference factors may include reciprocity, social proof, commitment, liking, authority, scarcity, unity or other influence dimension factors. Application goals can measure the value of a transportation plan to a transportation system or a stakeholder thereof. For example, a stakeholder may attempt to reduce emissions, increase revenue, reduce congestion, increase traffic to commercial areas, or the like. A transportation analysis system may use these combination of factors to determine a transportation plan that improves an application goal, is practical to a user, and is likely to be accepted by a user.

In some embodiments, systems and method described herein combine user models of transportation preferences, multi-modal transportation models, and energy models to identify routes that are acceptable to individuals that save energy and time, and therefore money across the entire transportation network. Some embodiments incorporate transportation system modeling with individual user impact modeling, based upon their explicit, implicit, or other expressed needs to generate personalized multi-modal transportation recommendations. Multi-modal transportation system include a variety of types of transportation means to get from one place to another within a geographic area. Multi-provider transportation systems incorporate different private providers into single plans. Impact modeling can capture a wide range of factors that might be important, favored, or otherwise have a preference to a user. In some embodiments, the system modeling captures the effects of those decisions on other travelers. In some embodiments, the systems and methods described can be used as mobility-as-a-service providers such as ride sharing services, mobility-as-a-service infrastructure services, transportation demand management automakers, smart city services, transportation departments, such as transit authorities or the like, or other users monitoring usage of transportation systems. In embodiments, the systems and methods described can be used by third-party companies and/or consumer businesses.

To generate a personal preference model for a user, the transportation analysis system can use both implicit and explicit data regarding the user. Explicit data can include a user survey or other provided data from the user. For example, the user may indicate they do not own a bike, cannot walk to work, prefer to use public transportation or the like. This data can rule out certain routes or modes of transportation as not being acceptable to the user. Implicit data can include data derived from other data sources. For example, the user may have health monitoring that indicates a low level of activity and increasing activity levels may be built into the user's profile. In another example, crime information may be used to identify areas of increased crime activity and rule out certain routes or modes of transportation. The transportation analysis system may also use calendar events, past acceptance of routes, job titles, or the like to generate a personal preference profile. The transportation analysis system may also use route ratings by a user as an input to update the preferences of a user in an associated user profile.

By modeling all modes of transportation in terms of a transportation analysis system can optimize one or more features, such as travel time, traffic levels, fuel consumption, comfort, or others factors that contribute to an application goal. In some embodiments, transportation plans may be combined with other dynamic contextual conditions that make one more or less preferable over another, such as traffic density and slowdowns, weather, importance of arriving on time and so on. In some embodiments, static or dynamic contexts may be received from third party data sources in real-time or near real-time. Because each potential transportation plan impacts other travelers both positively and negatively, the transportation analysis system an estimate the impact of a transportation plan including time, congestion, fuel, carpool options, or other impacts on a transportation system or geographic area. Accordingly, the transportation analysis system can select from a set of potential transportation plans that improve an application goal of a stakeholder in the transportation system as a whole.

In some embodiments, estimating the impact on the transportation system includes simulation of the transportation system. The simulation can be based on a model of the transportation system that includes a number of connected nodes and edges. The nodes can represent intersections of roads and connections between different modes of transportation. The edges can represent the distance, time, or energy consumption within those edges. In some embodiments, the simulation can determine an amount of time or energy consumed by the user or other travelers in the transportation based on the model. For example, if the user decides to travel and the travel includes time spent at an intersection, the transportation analysis system can simulate the impact based on determination of the additional time and fuel consumption generated by the increase in the number of acceleration and deceleration maneuvers of other vehicles that wait on the user.

By modeling each of the dimensions that may influence a user in selection of a transportation plan, the transportation analysis system can develop a highly targeted means of influencing an individual to make different transportation choices including mode, route, additional stops, and departure time based on application objectives (e.g., reducing energy, reducing congestion, reducing emissions, increasing store revenue, or the like). A user model can then be used to target messages to a user that are more likely to influence the user. For example, a user may be more influenced by how much a decision helps the environment. Accordingly, the transportation analysis system may generate a message indicating an amount of pollution that is reduced. Other users may be influenced by reducing congestion, monetary savings, or other messaging to influence to users.

In some embodiments, one or more factors or models may be generated by a machine learning system or be a machine learning model. For example, a user model may include a machine learning model that predicts an influence strategy for the user based on information known about the user. A machine learning system may input user demographic data, survey data, implicit data from third party sources, previous user responses, or the like to generate an output of a predicted influence strategy for the user, for instance. In some embodiments, a machine learning system may also update a machine learning model for a user based on training from subsequent responses to influence strategies. Other machine learning models may be used to define other factors when selecting routes and messaging strategies for a user.

FIG. 1 is a diagram showing a transportation analysis system 100 that generates a transportation plan from a first location to a second location. The transportation analysis system 100 also provide plans that take into account user preferences and the likelihood that a user will accept a suggested transportation plan based on those preferences and messaging directed to influencing the user. The transportation analysis system 100 can receive a request for a transportation plan from a user device 160 or another device associated with the user. The request can be an explicit request for a transportation plan or can be inferred based on a routine that is followed by a user. The transportation analysis system 100 can respond to the request by generating a set of transportation plans and selecting a preferred plan to provide to the user device 160. In some embodiments, the transportation analysis system 100 may use additional resources such as remote data sources 105 and transportation system data 115 to generate the transportation plan or determine user preferences and influence patterns. After a plan is selected by the transportation analysis system 100, it can be provided back to the user device 160. The selected plan may account for an overall impact of the user, the impact of the selected plan on an overall transportation system, and the likelihood of the user to accept the recommendation.

In some embodiments, the transportation analysis system 100 can include a user model generator 110, a transportation system optimization service 130, a transportation plan generator 120, a transportation plan selector 140 and a user interface generator 150. The user model generator 110 generates a user model 135 for a user that includes user preferences and a user influence model including messaging recommendations for influencing the user. The user model generator 110 may also use additional remote data sources 105. The transportation plan generator 120 can generate a number of transportation plans that are available to travel from the first location to the second location. For example, the transportation plan generator 120 may user transportation system data 115 or a transportation system model 125 that provides a model of available routes and modes of transport within the transportation system. The transportation plan generator 120 can then evaluate potential transportation plans to generate a number of plans for evaluation by a transportation system optimization service 130 or transportation plan selector 140. For example, the transportation system optimization service 130 may determine how a transportation plan affects one or more applications goals of the transportation system. In some embodiments, the transportation system optimization service 130 may select a subset of plans that have a positive impact on one or more applications goals as well as potential user preferences or transportation modes to which a user has access to or is willing to use.

The transportation analysis system 100 may also include a transportation plan selector 140 that selects a plan based on one or more of the user model 135 of the user and estimated impacts on the transportation system. The select plan can then be provided to the user device 160 through a user interface generator 150. Based on the selected plan, the user can choose whether or not to accept the selected plan. If the user selects the transportation plan, a navigation system 165 of the user device 160 can use the plan to direct the user to the requested destination.

The user model generator 110 of the transportation analysis system 100 can generate a model based on various types of data. For example, the user model generator 110 can user responses to a set of questions provided to a user. The user may provide available transportation modes that the user has, preferred modes of transportation, fitness level, whether they work on commutes, or the like. The user model 135 can also include preferences derived from actions of the user. For example, the user preferences 135 may be updated based upon responses of the user device 160 to proposed transportation plans. In addition, the user preferences 135 can generate preference from remote data sources 105 that pertain to the user. An example remote data source 105 can include a fitness tracker that counts steps for the user. If there is a change in the activity of the user, the user preferences 135 can be updated to indicate the user may want to exercise more. Other remote data sources 105 may include social networks of the user, preferences of users with similar demographics of the user, or other information provided by third party sources.

The user model 135 also includes an indication of a user's susceptibility to influence based on recommendations from the transportation analysis system 100. For example, certain users may be modeled as more likely to accept recommendations that differ from a normal commute than others. Additionally, the user model 135 may include a model of the likely types of influence that may impact that user more. For example, certain users may respond better to environmental concerns, while others may care more about time, congestion, or other factors.

Figure 2:
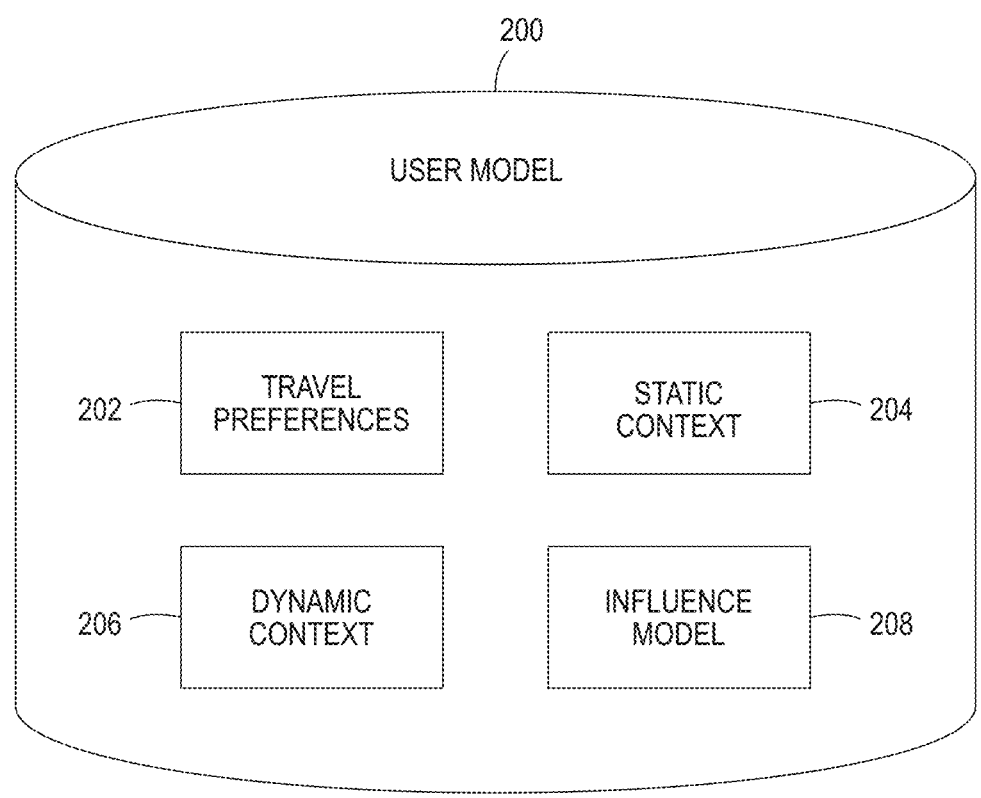
FIG. 2 is a schematic diagram of an embodiment of a user model to determine transportation plans and messaging, which can be used in accordance with some embodiments.

The user model 135 can then be used by the transportation plan selector 110. For example, the user model 110 may provide weights or models for different factors that are preferred by a user. Accordingly, the transportation plan selector 140 may provide an estimated likelihood of accepting a transportation plan based on user preferences and user influenceability. In some embodiments, the transportation plan selector 140 can then select a transportation plan to provide to the user device 160 based on the likelihood of acceptance and impact on application goals of the transportation analysis system 100. FIG. 2 describes additional details of an example user model 135, which may be used in accordance with implementations of the disclosure.

In some embodiments, the transportation plan generator 120 generates multi-modal transportations plans for the requested destination based on the transportation system model 125. The transportation system model 125 can include a virtual map of nodes and edges in a transportation system. The transportation system may be a particular geographic area or an area within which the locations of the requested transportation plan are located. The transportation system model 125 may include an amount of time taken to travel across an edge during different times of day and days of the week. The transportation system model 125 may also include congestion levels, average energy consumption for a transport across an edge, wait times at particular nodes, types of transfers at different nodes (e.g., which edges a traveler can move to at one node depending on which edge the traveler approached from), and the like. In some embodiments, other types of transportation system models may be used to generate transportation plans.

The transportation plan generator 120 then determines a set of potential transportation plans for the user to travel from one location to the desired location. In some embodiments the transportation plan generator 120 may generate plans that overlay the nodes and edges of the transportation system model 125. The transportation plan generator 120 may consider only the portions of the transportation system model 125 that have modes available to the user. For example, if the user preferences 135 indicate that the user cannot ride a bike, the transportation plan generator 120 may ignore those edges that require a bike to be practical. The transportation plan generator 120 may generate a number of potential plans as candidates for consideration by the transportation system optimization service 130 and transportation plan selector 140. In some embodiments, the request for a transportation plan may be received with time to generate, hundreds, thousands, tens of thousands, or more transportation plans. The transportation analysis system 100 can consider these plans impacts of the plans on application goals of the transportation system and a user's likelihood of accepting the plan.

In some embodiments, a transportation system optimization service 130 simulates one or more of the potential plans generated by the transportation plan generator 120. The simulation can provide estimated travel time, energy consumption, fuel costs, congestion, impact on revenue of local economies, or the like. These can be generated through the simulation for the user as well as the marginal travel time, energy consumption, fuel costs, congestion, or the like that is added to the transportation system as a whole based on the addition of the travel by the user. For example, for each transportation plan generated by the transportation plan generator 120, the transportation system optimization service 130 can simulate the time and energy consumed at each edge and node of a transportation system model. Those consumption levels can be added up for the user. In addition, the total time, energy, and congestion of the transportation system with the potential transportation plan can be compared to a total of the transportation system without the user. Accordingly, the comparison provides a difference in the efficiency of the transportation system for different transportation plans based on these comparisons. In some embodiments, the transportation system simulator 130 additionally uses transportation system data 115. The transportation system data 115 can provide updated information about traffic, weather, public transportation schedules, or the like to the transportation system optimization service 130. In some embodiments, the transportation systems data 115 can be pulled from a number of sources across a network. In some embodiments, the transportation system data 115 can also be part of remote data sources 105.

The transportation plan selector 140 can select one or more plans based on impact on application goals of the transportation system and the likelihood of a message influencing the user to accept that transportation plan. For example, the transportation plan selector 140 can compare the plans to determine those with an impact score over a threshold and with a positive (or least negative) estimated impact on the transportation system. In some embodiments, the transportation plan selector 140 may select those potential plans that have the highest percentile impact score compared to the other potential plans. The transportation plan selector 140 may also only consider those transportation plans with a highest percentile estimated impact on the transportation system. In some embodiments, the impact scores and the estimated impact on the transportation system may be combined a likelihood of a message influencing the user to accept that transportation plan to select a recommended transportation plan.

The user interface generator 150 can provide the selected plan to the user device 160 for the user to decide whether to use the plan. In some embodiments, more than one selected plan may be provided to the user device 160 with an indication of costs and benefits of each of the selected plans. The user interface generator 150 may communicate with a user device 160 through text messaging, email, a dedicated app, a navigation system 165, or other communication techniques. Furthermore, the user interface generator 150 can use data from the user model 135 to determine an influence strategy for contacting the user. For example, the user model 135 may rank the likelihood of different strategies for influencing the user. In some embodiments, the rankings may be based on implicit or explicit user data. Furthermore, the user model 135 may be trained based on user responses to update the ranking of various influence strategies. For example, the user model may recommend a certain type of message to contact the user, but over time the user may not accept transportation plans based on that type of messaging. Accordingly, the user model may update the ranking of messaging types to try other messages to influence the users.

In addition to general influence types, the user model 135 may include indications of the type of applications goals to which a user is more susceptible. For example, if a user indicates that conservation is important to them, then messaging directed toward reduced fuel consumption may be used more often in messages to influence the user. In various embodiments, other influence strategies may be used alone or in combination to influence the impact of messaging on a user.

In some embodiments, to generate a message, the user interface generator 150 may user one or more template messages for contacting the user device 160. For example, the messaging may include an application goal that is improved by use of the transportation plan as well as an indication of why the user should use the plan. For example, if the user is heavily influence by authority, a template message saying that a city mayor recommends the plan to help the city with congestion may be used. If the user is heavily influenced by community, the messaging may include a message describing how many people in the community are using a particular mode or route for transportation. Additional template messaging may accompany additional influence strategies. Example user interfaces are shown in FIGS. 3-6 below.

The user device 160 can be a user computing device such as a smartphone, personal computer, GPS system, in-vehicle navigation system, or another system. In some embodiments, the transportation analysis system 100 may be executed on user device 160. For example, the transportation analysis system 100 may operate using hardware resources of the user device 160. In some embodiments, the transportation analysis system 100 can operate on a host server separate from the user device. Upon receiving a selected transportation plan, the user device 160 can provide a user interface to the user. The user device then receives an indication of whether to proceed with the recommended transportation plan. In some embodiments, the user device 160 can then provide the transportation plan to a navigation system 165 and follow directions on the user device 160. In some embodiments, if the user does not accept the proposed route, the transportation analysis system 100 can provide alternative or other routes to the user device. In some embodiments, the user device 160 may revert to another navigation system 165 in response to declining the selected transportation plan.

FIG. 2 is an example of a user model 200 according to some implementations of the present disclosure. For example, the user model 200 may be the same or similar to a user model 135 as described with reference to FIG. 1 above. As shown, user model 200 includes travel preferences 202, static context 204, dynamic context 206, and an influence model 208, however, in some embodiments, a user model may include fewer or additional types of models. For example, dynamic context 206 may not be part of a user model, but may be used by a transportation plan generator.

In some embodiments, travel preferences 202 may include types of travel available to the user, preferences between those types of travel, desired times of travel, or other information about the user's travel preferences. The travel preferences may be used to determine available transportation plans based on available transportation. In addition, the travel preferences 202 may be used to determine which plans a user is likely to choose over others based on the preferred travel modes or times. The travel preferences 202 can also be used to generate messaging to influence the user. For example, a message may be created that recommends a transportation plan that avoids less preferred transportation modes.

Static context 204 can include additional information about a user and the user's environment. For example, static context 204 can include survey results from a user, prior history of accepting transportation plans, demographic information of the user, details of a transportation system surrounding the user, contact information of the user, or additional information. The static context data 204 can be used to refine transportation plans, model additional characteristics of a user, generate influence models or messaging for the user, or the like. For example, the static context 204 of a user can be used to generate influence model 208. Accordingly, static context 204 can be utilized to generate messages to improve acceptance of transportation plans for the user.

Dynamic context 206 includes changing information or a user's reaction to changing information. For example, dynamic context 206 can include weather and a user's preferred transportation modes in certain weather conditions. Dynamic context can also include congestion in a transportation system, availability of rideshare or other transportation modes with variable schedules or availabilities, or other information regarding changing conditions within a transportation system. The dynamic context 206 can be used for transportation plan generation, selection, or influence. For example, the dynamic context 206 can be used to determine available transportation plans or selection of a transportation plan to meet a user's preferences. In some embodiments, the dynamic context 206 can also be used to generate messaging based on the user's preferences. For example, if a user prefers to take the train when it is raining, a messaging component of a transportation analysis system may provide a message telling the user to use a transportation plan including a train route because it is raining. Accordingly, the dynamic context 206 can be used to influence users.

An influence model 208 of the user model 200 may provide a model that predicts the most influential modes of persuasion of a user. In some embodiments, the influence model 208 may be a machine learning model that predicts a user's influenceability based one or more of travel preferences 202, static context 204, dynamic context 206, or other information. For example, an influence model 208 may be generated by a user's answer to a number of survey questions. In some embodiments, the influence model 208 may also be dynamically updated based on feedback from a user. For example, if a type of influence messaging is rejected by a user, the influence model 208 may be updated to favor that type of messaging for persuasion in future messages.

Figure 3:
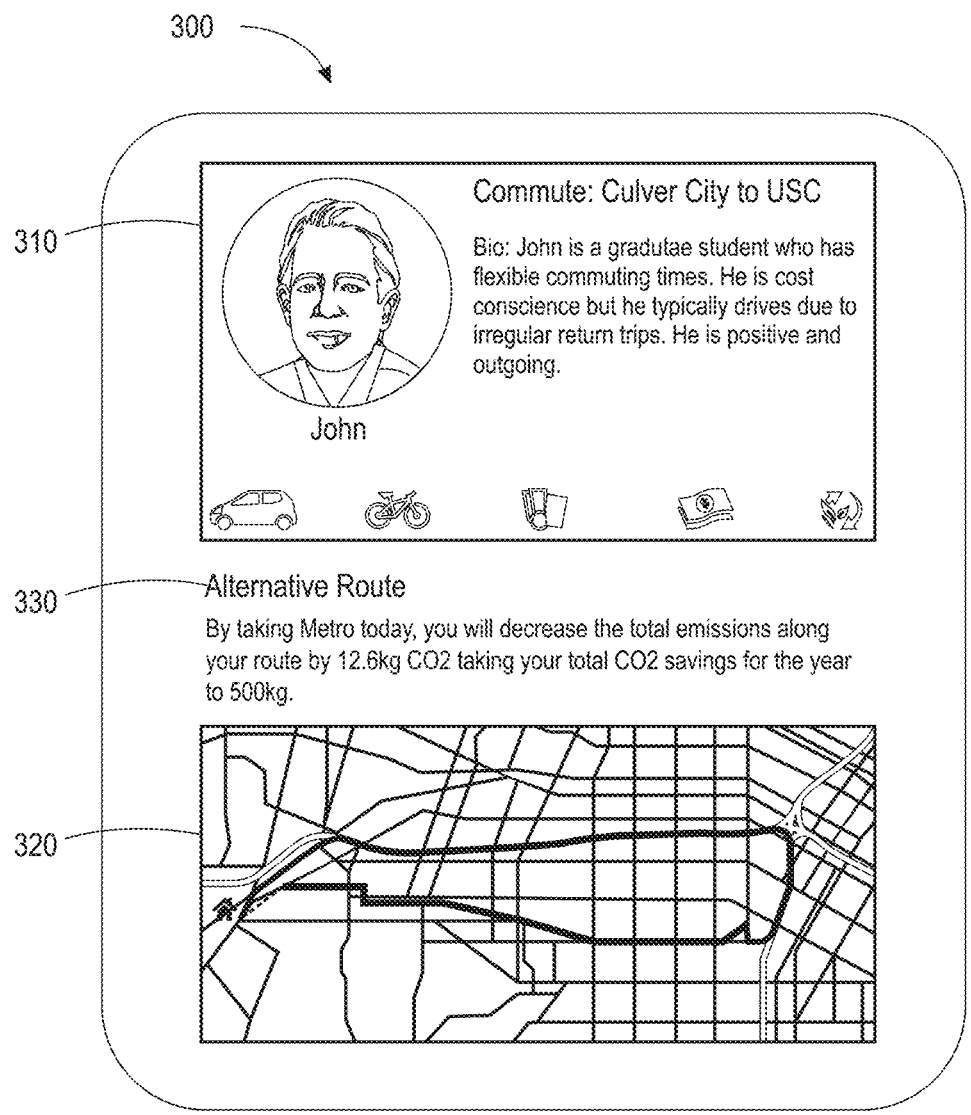
FIG. 3 is a user interface including a transportation plan, which can be analyzed in accordance with some embodiments.

FIG. 3 is an example user interface 300 that may be provided on a user device according to aspects of the disclosure. In some embodiments, the user interface 300 may be provided on a user device as discussed with reference to FIG. 1. For example, the user interface 300, or data populating the user interface 300, may be provided by a user interface generator 150 of a transportation analysis system 100 as described with reference to FIG. 1. Although shown with particular features, the user interfaces shown in FIG. 3 may include fewer, additional, or different features than those that are shown. For example, user interface 200 may not include profile information of the user.

The user interface 300 includes a description 310 of a user profile of the user. In some embodiments, the user may update their profile with additional information. A transportation analysis system can then update a user model for the user accordingly. For example, if a user changes preferences, modes of available transportation, or the like, a user model (such as user model 200 in FIG. 2) can be updated accordingly by a user model generator. The user interface also includes a map 320 showing the user an alternative transportation plan. The map 320 includes a normal route for the user as well as an alternative trip. The alternative trip may be provided to the user based on a selected transportation plan generated by a transportation analysis system as described with reference to FIG. 1. For example, the transportation plan may have been selected in response to a determination of the likelihood of acceptance by the user.

In addition to the map, the user interface 300 may include a description 330 of the changes to the transportation plan and the estimated impact of those changes. As shown in FIG. 3, the change to taking the metro reduces emissions compared to the normal transportation methods. The messaging may be selected based on an influence model of the user. For example, John may have a model indicating that he is interested in his impact on the environment and world around. Accordingly, a messaging system can use a template an insert emissions savings attributable to the change in his activity. For instance, a transportation analysis system may insert values for the emission savings and savings for the year based on previous route changes by the user. If a different influence model was generated for the user, the same route may be selected with different messaging. For example, if a user is more likely to be influenced by social proof, messaging may suggest that a certain number of people ride the metro everyday as part of the way to improve the area in which they live. In some embodiments, the user interface 300 may also include one or more controls for the user to accept or decline the transportation plan provided.

Figure 4:
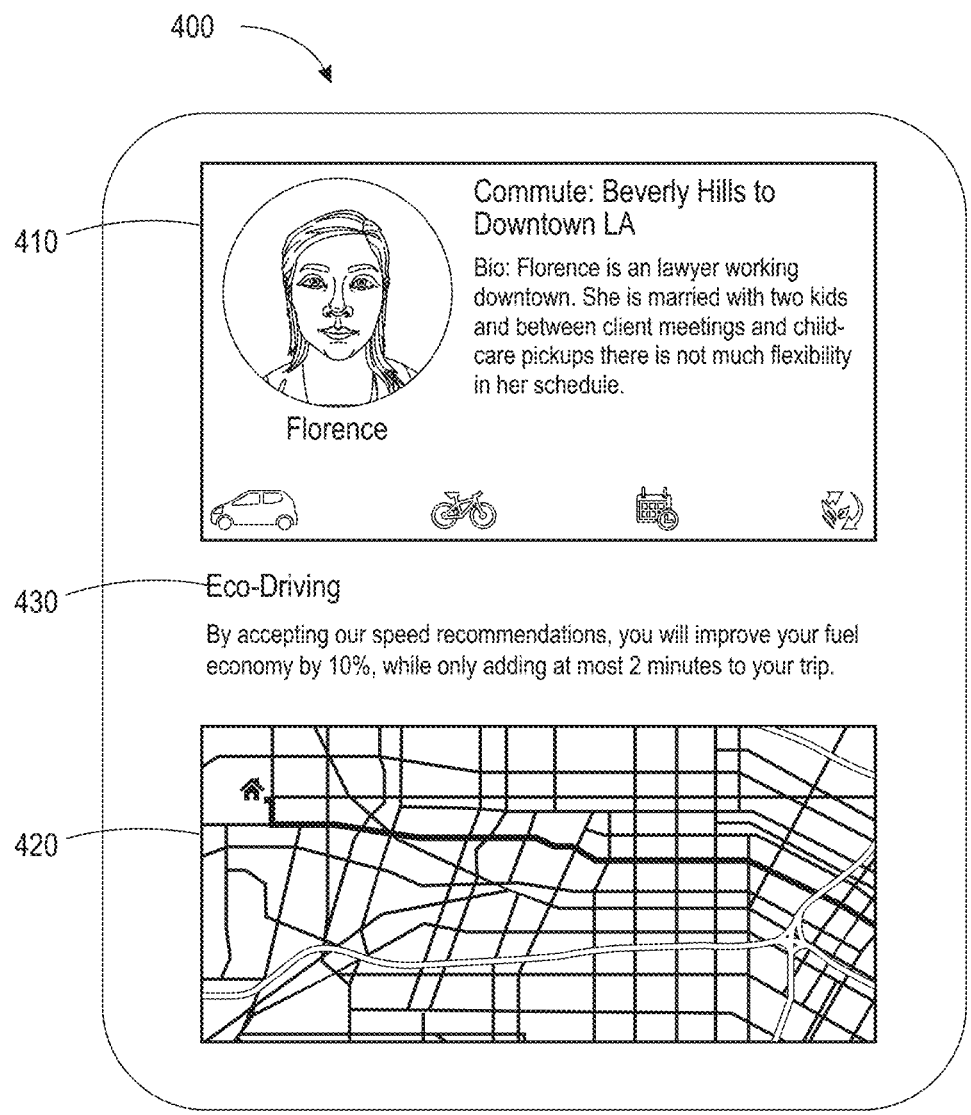
FIG. 4 is a user interface including a transportation plan, which can be analyzed in accordance with some embodiments.

FIG. 4 is an example user interface 400 that may be provided on a user device according to aspects of the disclosure. In some embodiments, the user interface 400 may be provided on a user device, for example as discussed with reference to FIG. 1. For example, the user interface 400, or data populating the user interface 400, may be provided by a user interface generator 150 of a transportation analysis system 100 as described with reference to FIG. 1. Although shown with particular features, the user interface shown in FIG. 4 may include fewer, additional, or different features than those that are shown. For example, user interface 400 may not include profile information of the user.

The user interface 400 includes a description 410 of a user profile of the user. In some embodiments, the user may update their profile with additional information. A transportation analysis system can then update a user model for the user accordingly. For example, if a user changes preferences, modes of available transportation, or the like, a user model (such as user model 200 in FIG. 2) can be updated accordingly by a user model generator. The user interface also includes a map 420 showing the user selected transportation plan. In some embodiments, the map 420 shows the normal route taken by the user.

The user interface includes a message 430 designed to influence the user to use the selected transportation plan. As shown, the message describes changing the driving speed of the user based on the user's driving habits. The recommendation is to accept the driving speeds of the navigation system. The description shows the benefit of the slower speeds to the user. This may be determined based on comparison of a potential transportation plan to the normal transportation of the user. The message 430 may be selected based on an influence model for the user. For example, an influence model for the user may indicate that the user is conscious of time and select a message template showing a benefit received with a small cost. Accordingly, the generated message 430 may be selected to show improvements to fuel economy as well as indicate to the user that there will not be a change in time. In some embodiments, the user interface 400 may also include one or more controls for the user to accept or decline the transportation plan provided.

FIGS. 3 and 4 provide example user interfaces that are generated to improve acceptance of transportation plans that fulfil one or more applications goals of a stakeholder of a transportation system. For example, the application goals can include reducing congestion, reducing emissions, increasing revenue from businesses in certain areas, or the like. While shown with particular messaging for example users, a transportation analysis system may user a variety of messages to influence particular users of a transportation system. Accordingly, FIGS. 3 and 4 are non-limiting examples of potential user interfaces which may be provided to one or more users.

Figure 5:
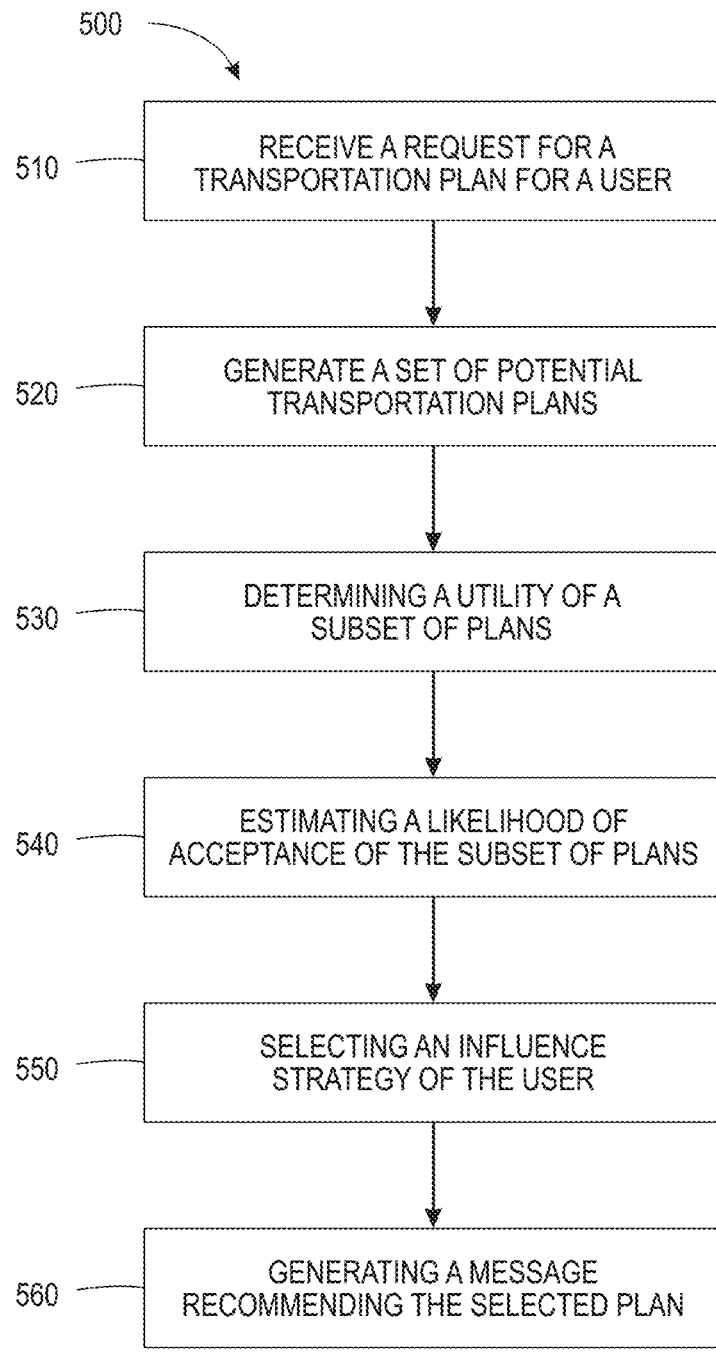
FIG. 5 is a flow diagram of an embodiment of a method of generating transportation plan, in accordance with some embodiments.

FIG. 5 is a flowchart 500 illustrating example operations of a transportation analysis system. For example, the processes described with reference to FIG. 5 may be performed by a transportation analysis system 100 as described with reference to FIG. 1. Beginning at block 510, the transportation analysis system receives a request for a transportation plan for a user. The request may include a starting point and ending point of a route that is requested. In some embodiments, the request may be given explicitly by a user, or it may be predicted based on a routine of the user.

In block 520, the transportation analysis system generates a set of potential transportation plans for the user. The transportation plans may be based on a transportation system model for the area the user is located. In some embodiments, the potential transportation plans may be limited to modes of transportation that are available to a particular user. In some embodiments, the transportation plans may be generated by a transportation plan generator 120 as described with reference to FIG. 1.

In block 530, the transportation analysis system determines an impact for at least a first subset of plans in the set of potential transportation plans. For example, the impact may be generated based on one or more application goals of the transportation analysis system. The impact may include transportation time of the user, emissions of the user, congestion of the transportation system traffic passing certain locations, overall impact on a transportation system, or other impact measures. In some embodiments, the estimations may be generated through simulation of the transportation plans within the transportation system model. In some embodiments, the estimations for the plan may be generated based on a combination of user models and application goals.

In block 540, the transportation analysis system estimates a likelihood of acceptance of the subset of plans in the set of potential transportation plans based on a personal preference model for the user. For example, the transportation analysis system may determine that certain transportation plans are not likely to be accepted by the user based on personal preferences of the user in a user model. The transportation analysis system may also use static and dynamic contexts to determine which transportation plans are most likely to be accepted by the user.

In block 550, the transportation analysis system selects an influence strategy for the user. For example, the influence strategy may be based on an influence model of the user. The influence model may indicate which of a number of influence strategies are most likely to persuade the user to accept a transportation plan. For example, different influence strategies may be targeted to a user based on influenceability dimensions of the user. In some embodiments, these dimensions may include reciprocity, social proof (conformity), commitment, liking, authority, scarcity, and unity (the more we identify with others, the more we are influenced by them), although, other embodiments may use other influence strategies based on priorities of the user. For example, other influence strategies may include priorities such as time, money, comfort, or the like. In some embodiments, an influence model may be a machine learning process that predicts a best influence model for the user based on information known about the user. In some embodiments, the influence model may be updated over time in response to a user accepting or rejecting transportation plans with particular influence messaging.

In block 560, the transportation analysis system generates a message recommending a selected plan from the subset of plans for the user, wherein the message is generated based on the selected influence strategy. For example, in some embodiments, a user interface generator may access a database of messaging templates and select a template that matches the influence strategy selected. The transportation analysis system can then determine based on one or more impact determination appropriate details to fill in the message template. For example, if a message is directed to a user that is influenced by reciprocity, the message may indicate the savings the user will receive in gas money for taking a slower route. In some embodiments, a transportation analysis system may generate messages in other manners, such as natural language processing or machine learning systems.

Various operations are described as multiple discrete operations, in turn, in a manner that is most helpful in understanding the present disclosure, however, the order of description may not be construed to imply that these operations are necessarily order dependent. In particular, these operations need not be performed in the order of presentation.

Figure 6:
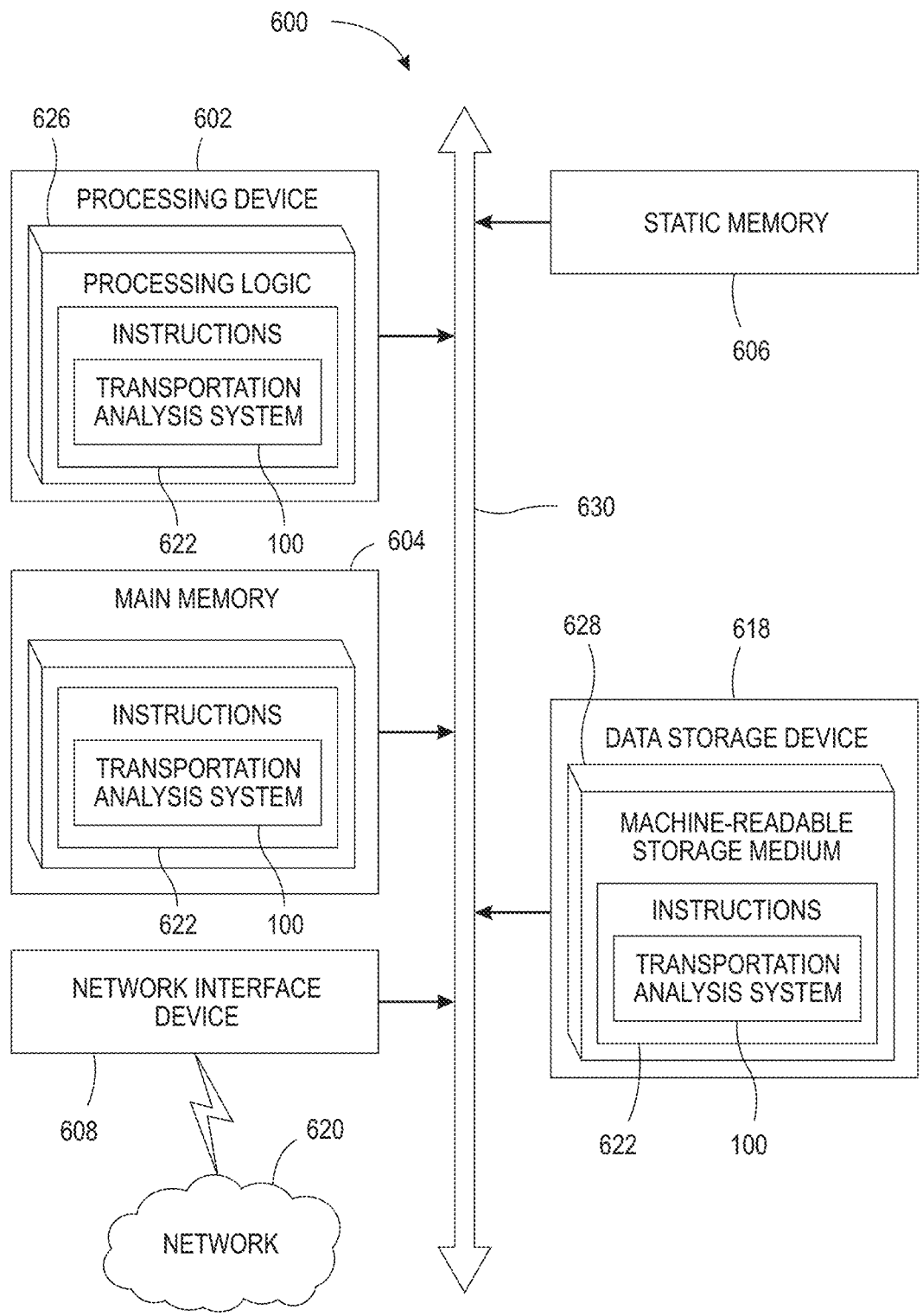
FIG. 6 is an illustration showing an example computing device which may implement the embodiments described herein.

FIG. 6 illustrates a diagrammatic representation of a machine in the example form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server computer system, such as transportation analysis system 100.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of transportation analysis system 100 shown in FIG. 1, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute transportation analysis system 100. The instructions 622 may also reside, completely or at least partially, within the main memory 604 or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for analyzing log data received from networked devices, as described herein. While the machine-readable storage medium 628 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof.

What is claimed is:

1. A method comprising:

receiving a request for a transportation plan for a user, wherein the request comprises a starting point and an ending point for a route;

generating a set of potential transportation plans for the route;

determining an impact of a subset of plans in the set of potential transportation plans;

estimating, by a processing device of a transportation analysis system, a likelihood of acceptance of the subset of plans in the set of potential transportation plans based on personal preference of the user;

selecting, by the processing device, an influence strategy based on inference over user data of a user model;

generating, by the processing device, a message recommending a selected plan from the subset of plans for the user, wherein the message is generated based on the selected influence strategy and wherein the selected transportation plan is provided to and utilized by a navigation system of a user device associated with the user;

receiving, from the user device, an indication that the user did not accept the selected transportation plan; and updating the user model based on the user not accepting the selected transportation plan, wherein after being updated, the user model is used to generate an updated selected transportation plan, wherein the updated selected transportation plan is provided to and utilized by the navigation system.

2. The method of claim 1, wherein the influence strategy is determined by inference over user data using an influence model of the user model.

3. The method of claim 2, wherein the influence model comprises a machine learning model.

4. The method of claim 1, wherein determining the impact of the subset of plans comprises estimating a travel time and a fuel consumption comprises simulating the potential transportation plans across a transportation system.

5. The method of claim 1, further comprising generating the user model based on explicit and inferred data regarding the user.

6. The method of claim 1, wherein generating the message comprises:

identifying a messaging template based on the selected influence strategy; and completing the messaging template based at least in part of a first impact measurement of the selected transportation plan.

7. The method of claim 1, further comprising:

estimating a measurement of change to a transportation system for the subset of plans; and selecting the selected plan based on the estimated measurement of change to the transportation system and the estimated likelihood of acceptance of the subset of plans.

8. The method of claim 1, further comprising providing the generated message to the user device through a user interface.

9. A system comprising:

a memory device; and a processing device operatively coupled to the memory device, wherein the processing device is to:

receive a request for a transportation plan for a user, wherein the request comprises a starting point and an ending point for a route;

generate a set of potential transportation plans for the route;

determine an impact of a subset of plans in the set of potential transportation plans;

estimate, by a transportation analysis system, a likelihood of acceptance of the subset of plans in the set of potential transportation plans based on personal preference of the user;

select an influence strategy of the user based on a user model associated with the user, wherein the influence strategy is determined by inference over user data;

generate a message recommending a selected transportation plan for the user, wherein the message is generated based on the selected influence strategy and wherein the selected transportation plan is provided to and utilized by a navigation system of a user device associated with the user;

receive, from the user device, an indication of that the user did not accept the selected transportation plan; and update the user model based on the user not accepting the selected transportation plan, wherein after being updated, the user model is used to generate an updated selected transportation plan, wherein the updated selected transportation plan is provided to and utilized by the navigation system.

10. The system of claim 9, wherein the influence strategy is determined by inference over user data using an influence model.

11. The system of claim 10, wherein the influence model comprises a machine learning model.

12. The system of claim 9, wherein the personal preference is based on at least one of publicly available sources, private data, surveys or user input.

13. The system of claim 9, wherein to determine the impact of the subset of plans, the processing device is further to estimate a travel time and a fuel consumption comprises simulating the potential transportation plans across a transportation system.

14. The system of claim 9, wherein the processing device is further to generate the user model based on explicit and inferred data regarding the user.

15. The system of claim 9, wherein to generate the message the processing device is further to:

identify a messaging template based on the selected influence strategy; and complete the messaging template based at least in part of a first impact measurement of the selected transportation plan.

16. The system of claim 9, wherein the processing device is further to:

estimate a measurement of change to a transportation system for the subset of plans; and select the selected plan based on the estimated measurement of change to the transportation system and the estimated likelihood of acceptance of the subset of plans.

17. A non-transitory computer-readable medium having instructions stored thereon that, when executed by a processing device, cause the processing device to:

receive a request for a transportation plan for a user, wherein the request comprises a starting point and an ending point for a route;

generate a set of potential transportation plans for the route;

determine an impact of a subset of plans in the set of potential transportation plans; and estimate, by the processing device of a transportation analysis system, a likelihood of acceptance of the subset of plans in the set of potential transportation plans based on personal preference of the user;

select an influence strategy of the user based on a user model associated with the user; generate a message recommending a selected transportation plan for the user, wherein the influence strategy is determined by inference over user data, wherein the message is generated based on the selected influence strategy and wherein the selected transportation plan is provided to and utilized by a navigation system of a user device associated with the user;

receive an indication of that the user did not accept the selected transportation plan; and update the user model based on the user not accepting the selected transportation plan, wherein after being updated, the user model is used to generate an updated selected transportation plan, wherein the updated selected transportation plan is provided to and utilized by the navigation system.

18. The non-transitory computer-readable medium of claim 17, wherein the influence strategy is determined by inference over user data using an influence model.

19. The non-transitory computer-readable medium of claim 17, wherein the influence model comprises a machine learning model.

20. The non-transitory computer-readable medium of claim 17, wherein to determine the impact of the subset of plans, the processing device is further to estimate at least one of a travel time or a fuel consumption.

\* \* \* \* \*